March 16, 1948.  N. D. HERNÁNDEZ  2,438,052
SAFETY CONTAINER
Filed Sept. 7, 1945
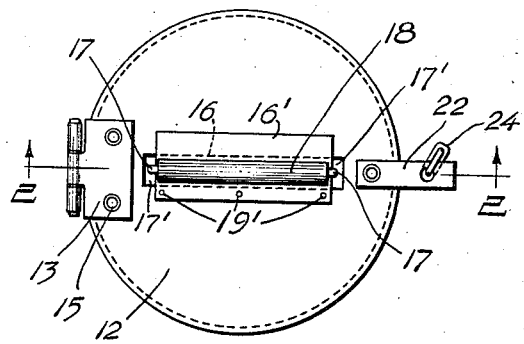
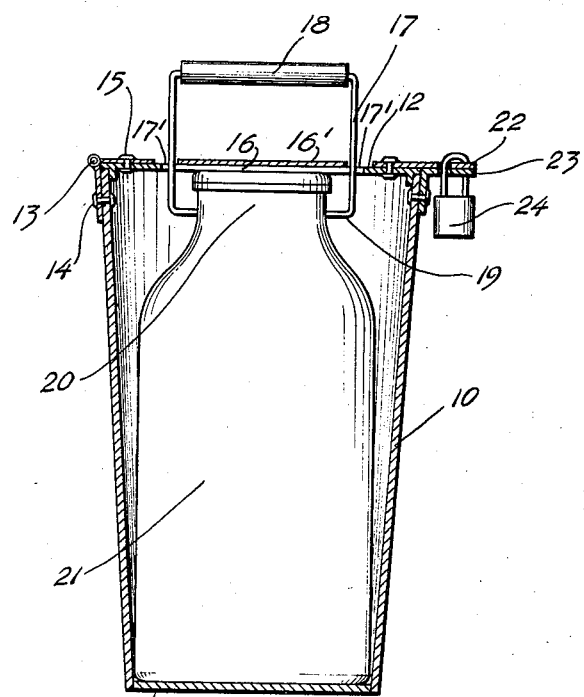
Inventor
NORBERTO DAVILA HERNÁNDEZ
By Clarence A. O'Brien
and Harvey B. Jacobson
Attorneys Patented Mar. 16, 1948

2,438,052

UNITED STATES PATENT OFFICE 2,438,052

SAFETY CONTAINER

Norberto Dávila Hernández, Rio Piedras, P. R.

Application September 7, 1945, Serial No. 614,974

1 Claim. (Cl. 232—41)

The invention relates to a container, and more especially to a safety container.

The primary object of the invention is to preserve the contents of a container safe, clean, and fresh from contamination, the container being equipped with a lock, having duplicate keys, one of which is carried by the customer and the other key by a custodian so that access can be had only by an authorized party.

Another object of the invention is the provision of a container of this character which may be readily padlocked, thus making the contents safe from unscrupulous use thereof.

A further object of the invention is the provision of a container of this character, which is simple in construction, reliable and efficient in its purpose, strong, durable, neat in appearance, portable, safe in the use thereof, thoroughly sanitary, and inexpensive to manufacture.

With these and other objects in view, the invention consists in the features of construction and combination and arrangement of parts, as will be hereinafter more fully described and illustrated in the accompanying drawing, which discloses the preferred embodiment of the invention, and pointed out in the claim hereunto appended.

In the accompanying drawing:

Figure 1 is a top plan view of a container constructed in accordance with the invention.

Figure 2 is a sectional view taken approximately on a line 2—2 of Figure 1 looking in the direction of the arrows.

Similar reference characters indicate corresponding parts throughout the several views in the drawing.

Referring to the drawing in detail, the container constituting the present invention comprises a substantially cup-shaped or downwardly tapered cylindrical body 10, preferably made from weather-resisting material, permanently closed at its bottom 11, while the opposite or top end of body 10 is fully open and adapted to be closed by a swinging lid or cover 12, vertically swingable on a pivot hinge 13 which is fixed at 14 to the body 10, and to the lid 12 as at 15.

An elongated slot 16 is formed through the lid cover 12, and a metal slot covering plate 16' of less length than said slot is adapted to overlie the slot leaving spaced apertures 17' at either end of the plate for slidably and non-removably receiving the arms of an inverted U-shaped yoke or handle 18 having intimately turned jaws 19 on its lower end which will readily engage the mouth rim 20 of a bottle or the like 21 placed within the body 10 (see Figure 2). Suitable fasteners 19' will extend through one edge of the slot covering plate 16' and the lid or cover 12 for holding the plate 16' in fixed position. The handle 18 holds the bottle 21 relatively fixed within the body 10 and also functions as a handle for the carrying of such body in the hand of a user.

Provided on the lid 12 diametrically opposite the hinge 13 is a padlock hasp extension 22 adapted to register with a keeper 23 fixed to the body 10 and with these is detachably engaged a padlock 24, one key of which is adapted to be held by a customer or user of the container and the other by a custodian such as a restaurateur or boarding housekeeper so that these persons are normally the only ones having access to the contents of the body 10.

The body 10 with its lid or cover 12 maintains the contents of such body in good condition, clean and free from contamination.

The handle bar 18 can be readily detached from the bottle or the like 21 by lateral shifting or swinging thereof out of the path of the rim 20 of such bottle 21 and when the lid or cover 12 is free it can be opened to give access to the interior of the body 10 of such container.

From the foregoing it will now be seen that there is herein provided a device accomplishing all the objects of this invention, and others, including many advantages of great practical utility and commercial importance.

As many embodiments may be made of the invention concept, and as many modifications may be made in the embodiment herein shown and described it is to be understood that all matter herein is to be interpreted merely as illustrative and not in a limiting sense.

What is claimed is:

A container having a closed bottom and side walls, a cover hinged to the upper edge of said container having locking means disposed diametrically from said hinge, said cover having an elongated slot formed through it, a slot covering plate of lesser length than said slot secured to said cover to extend transversely thereof providing spaced apertures at the opposite ends of the slot, an inverted U-shaped handle having inturned lower supporting ends adapted to extend through said apertures whereby the inturned lower supporting ends of said inverted U-shaped handle will positively engage a collared object when disposed in said container to support the same, and the top of said object will in turn support said container.

NORBERTO DÁVILA HERNÁNDEZ.

REFERENCES CITED

The following references are of record in the file of this patent:

UNITED STATES PATENTS

| Number | Name | Date |
|---|---|---|
| 351,203 | Searles | Oct. 19, 1886 |
| 1,778,772 | Reid | Oct. 21, 1930 |